(12) United States Patent
Murialdo et al.

(10) Patent No.: US 11,271,747 B2
(45) Date of Patent: Mar. 8, 2022

(54) OPTICAL AUTHENTICATION OF IMAGES

(71) Applicant: Lawrence Livermore National Security, LLC, Livermore, CA (US)

(72) Inventors: Maxwell R. Murialdo, Westminster, CA (US); Brian Giera, San Mateo, CA (US); Brian M. Howell, Livermore, CA (US); Robert M. Panas, Dublin, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 148 days.

(21) Appl. No.: 16/571,586

(22) Filed: Sep. 16, 2019

(65) Prior Publication Data

US 2021/0083879 A1    Mar. 18, 2021

(51) Int. Cl.
*H04L 29/06* (2006.01)
*H04L 9/32* (2006.01)
(Continued)

(52) U.S. Cl.
CPC ............ *H04L 9/3236* (2013.01); *G06F 21/10* (2013.01); *G06F 21/64* (2013.01); *G06N 10/00* (2019.01);
(Continued)

(58) Field of Classification Search
CPC ....... H04L 9/3247; H04L 9/0819; H04L 9/14; H04L 9/3236; H04L 9/3268; H04L 63/0471; H04L 9/3265; H04L 9/083; H04L 9/3263; H04L 9/0891; H04L 9/0825; H04L 9/0643; G06F 21/62; G06F 21/645; G06F 21/602
See application file for complete search history.

(56) References Cited

U.S. PATENT DOCUMENTS 10,291,395 B1 * 5/2019 Nenov ................ H04L 63/0428
10,554,401 B1 * 2/2020 Lee ...................... G06Q 20/227
(Continued)

OTHER PUBLICATIONS

NPL-1 :Fingerprint authentication and security risks in smart devices Google Scholar ieeexplore.ieee.org Zafar M 2016 22nd International Conference on Automation and Computing (ICAC) Published 2016, pp. 1-6. (Year: 2016).*
(Continued)

*Primary Examiner* — Sher A Khan
(74) *Attorney, Agent, or Firm* — Perkins Coie LLP

(57) ABSTRACT

Systems and methods performed for generating authentication information for an image using optical computing are provided. When a user takes a photo of an object, an optical authentication system receives light reflected and/or emitted from the object. The system also receives a random key from an authentication server. The system converts the received light to plenoptic data and uploads it to the authentication server. In addition, the system generates an optical hash of the received light using the random key, converts the generated optical hash to a digital optical hash, and uploads the digital optical hash to the authentication server. When the authentication server receives the upload, it verifies whether the time of the upload is within a certain threshold time from the sending of the random key and whether the digital optical hash was generated from the same light as the plenoptic data.

37 Claims, 8 Drawing Sheets

(51) Int. Cl.
    *H04L 9/08*     (2006.01)
    *H04L 9/06*     (2006.01)
    *G06N 10/00*     (2022.01)
    *H04N 5/225*     (2006.01)
    *G06T 7/00*     (2017.01)
    *G06F 21/10*     (2013.01)
    *G06F 21/64*     (2013.01)

(52) U.S. Cl.
    CPC .......... *G06T 7/0002* (2013.01); *H04L 9/0643* (2013.01); *H04L 9/0819* (2013.01); *H04L 9/0877* (2013.01); *H04L 9/0894* (2013.01); *H04L 9/3247* (2013.01); *H04L 9/3297* (2013.01); *H04N 5/22541* (2018.08); *G06F 2221/0733* (2013.01); *G06T 2207/10052* (2013.01); *H04L 2209/38* (2013.01)

(56) References Cited

U.S. PATENT DOCUMENTS

| | | | | |
|---|---|---|---|---|
| 2005/0284928 | A1* | 12/2005 | Harrell | G07F 13/025 235/380 |
| 2006/0233423 | A1* | 10/2006 | Najafi | G06T 7/75 382/103 |
| 2008/0005029 | A1* | 1/2008 | Ando | G06F 21/10 705/51 |
| 2008/0114858 | A1* | 5/2008 | Singh | H04L 67/1008 709/218 |
| 2008/0159112 | A1* | 7/2008 | Van Der Lee | G11B 7/131 369/112.01 |
| 2009/0070860 | A1* | 3/2009 | Hirata | G06F 21/32 726/5 |
| 2012/0098754 | A1* | 4/2012 | Kim | H04N 1/0035 345/173 |
| 2012/0327262 | A1* | 12/2012 | Arakawa | H04N 5/2354 348/222.1 |
| 2013/0222835 | A1* | 8/2013 | Iwamoto | G06F 21/608 358/1.14 |
| 2014/0098191 | A1* | 4/2014 | Rime | H04N 5/23222 348/46 |
| 2015/0234102 | A1* | 8/2015 | Kurzweg | G01J 3/32 348/360 |
| 2015/0374215 | A1* | 12/2015 | Dulkiewicz | A61B 1/00156 600/109 |
| 2017/0091550 | A1* | 3/2017 | Feng | G06T 7/38 |
| 2017/0099287 | A1* | 4/2017 | Short, III | H04L 63/08 |
| 2018/0121724 | A1* | 5/2018 | Ovsiannikov | G06K 9/00617 |
| 2019/0138740 | A1* | 5/2019 | Ricknas | G06F 21/606 |
| 2021/0018736 | A1* | 1/2021 | Yuan | G02B 21/0032 |

OTHER PUBLICATIONS

NPL-2:Biometric authentication protocols on smartphones: An overview Google Scholar dl.acm.org Stokkenes M Proceedings of the 9th International Conference on Security of Information and Networks Published 2016 (Year: 2016).*

NPL-3: Secure smart card signing with time-based digital signature Google Scholar www.cs.ucf.edu Rezaeighaleh H 2018 International Conference on Computing, Networking and Communications (ICNC) Published 2018, pp. 182-187. (Year: 2018).*

Cheremkhin, P.A et al. "Analysis of security of optical encryption with spatially incoherent illumination technique," SPIE Conf on Practical Holography XXXI—Materials & Applications, San Francisco, Jan. 30-Feb. 1, 2017, SPIE Intl Soc Optical Engineering.

Christlein, V et al. "An Evaluation of Popular Copy—Move Forgery Detection Approaches." IEEE Transactions on Information Rorensics and Security, Dec. 2012, 7(6), 1841-1854.

Deng, J et al. "ImageNet: A Large-Scale Hierarchical Image Database," IEEE Computer Society Conference on Computer Vision and Pattern Recognition Workshops, Miami Beach FL, Jun. 20-25, 2009, p. 248-255.

Dolev, S. et al. "Masking traveling beams: Optical solutions for NP-complete problems, trading space for time." Theoretical Computer Science, Jun. 2009, 411(6), 837-853.

Goliaei, S et al. "An optical solution to the 3-SAT problem using wavelength based selectors." Journal of Supercomputing 2012, 62(2), 663-672.

Hu, D. et al. "On digital image trustworthiness." Applied Soft Computing, Jul. 2016, 48, 240-253.

Solli, D.R. et al. "Analog optical computing." Nature Photonics, Nov. 2015, 9(11), 704-706.

Suwajanakorn, S. et al. "Synthesizing Obama: Learning Lip Sync from Audio." ACM Transactions on Graphics, Jul. 2017, 36(4), 13.

Tajahuerce, E. et al. "Optical security and encryption with totally incoherent light." Optics Letters, May 15, 2001, 26(10), 678-680.

Thies, J. et al. "Face2Face: Realtime Face Capture and Reenactment of RGB Videos," 2016 IEEE Conference on Computer Vision and Pattern Recognition (CVPR), Seattle WA, Jun. 27-30, 2016, pp. 2387-2395.

* cited by examiner

OPTICAL AUTHENTICATION OF IMAGES

STATEMENT REGARDING FEDERALLY SPONSORED RESEARCH

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND

Since the inception of ImageNet by Fei-Fei Li in 2009, image alteration technologies using machine learning (e.g., deep neural networks) have become increasingly more effective at modifying images in a way that is difficult to detect. For example, animation producers can use a deep learning technology to generate real-time lip sync for animated characters, which had to be manually produced by a skilled animator in the past. Despite many positive contributions, these technologies also have enabled people to create forgeries of images (e.g., photos and videos) with only minimal training, software, and expense. These technologies (e.g., deepfake) can create "whole cloth" forgeries or manipulate existing photos and videos in convincing ways. For example, deepfake videos of Barack Obama and Donald Trump giving forged speeches have surfaced on the Internet.

These technologies require significantly less expertise, resources, and efforts than other forms of image alteration technologies and are becoming democratized technologies allowing anyone to perpetrate forgeries with minimal effort. Recent advances allow for forgery of facial expressions, complex body motions, and even voice recordings. While invaluable to the film industry, these technologies threaten to undermine key components of journalism, activism, law enforcement, the insurance industry, etc. Furthermore, detection of deepfakes requires significant time, expertise, and computational expense.

In some cases, machine learning algorithms are being harnessed to help detect deepfakes. However, this sets up an information arms race between forgers and digital forensics detectives, since advancements in forgery detection are rapidly countered with more advanced forgeries. Conventional digital forensics in the past have attempted to detect forgeries by looking for digital manipulation errors. These errors include pixel misalignments, statistical errors among neighboring pixels, copied pixels, nonphysical effects in lighting, reflections, or shadows, and so on. These errors, however, are gradually being corrected in forgeries using adversarial machine learning techniques. Detecting deepfakes often requires looking for small incongruities such as an unnaturally low frequency of blinking or subtle color changes in the skin with each heartbeat. However, as soon as these incongruities become known to forgers, new and improved forgeries can be rapidly developed to circumvent detection techniques.

Digital watermarking and trusted timestamping (e.g., on a blockchain) have been used to validate that photos have not been manipulated after their publication or dissemination. However, these techniques cannot authenticate whether a photo or video was authentic to begin with. Companies like Cannon and Nikon have produced specialized cameras with internal hardware that digitally signed photographs as they were stored using a private key held within the hardware. These systems, however, were rapidly compromised due to security flaws in the manner the private key was held in the hardware. These serious security vulnerabilities are inherent in systems that attempt to digitally sign photographs as a mechanism to authenticate photos. Any system that places the private key in the hands of potential forgers is susceptible to cracking or reverse engineering. More importantly, these systems must first convert the incoming light signal into an electronic signal (e.g., with CCD or CMOS detectors) and then subsequently encrypt the electronic signal with a digital signature. This protocol has a fundamental vulnerability in that the electronic signals may be spoofed using advanced algorithms before the electronic signals are encrypted in the first place.

DETAILED DESCRIPTION

Figure 1:
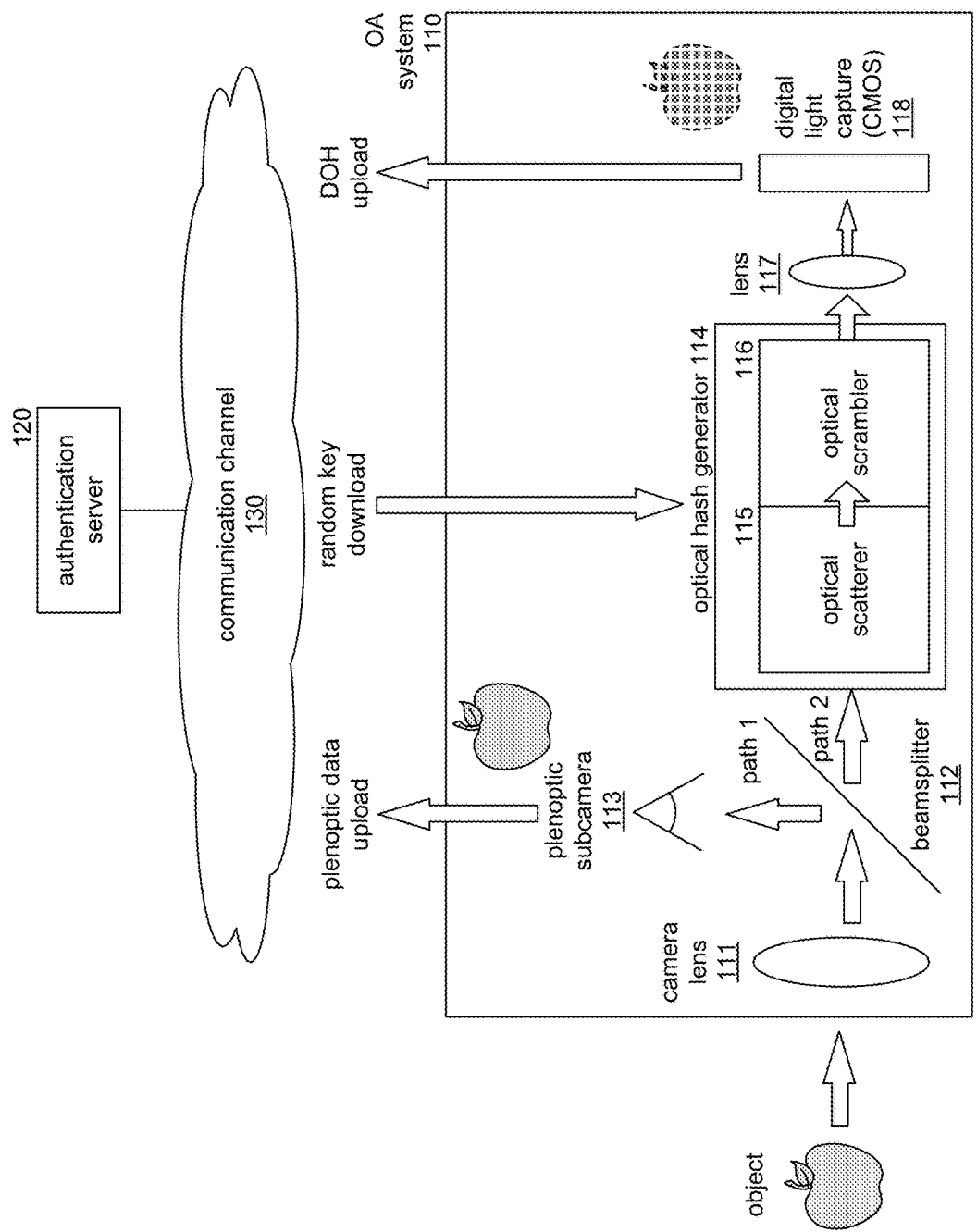
FIG. 1 is a schematic diagram that illustrates components of an OA system in some embodiments.

Methods and systems for authenticating an image using optical computing are provided. In some embodiments, an optical authentication (OA) system is embedded in an image capturing device (e.g., a camera) to generate authentication information for an image using optical computing. The authentication information can be used to verify whether an image is an unaltered version of the image captured by the image capturing device. When a user takes a photo of an object using an image capturing device, light that is reflected and/or emitted from the object enters the image capturing device through a lens. The OA system splits the incoming light into two paths (e.g., using a beam splitter). Path 1 leads to a plenoptic (light field) camera that captures the entire vector field of the light, including its intensity and direction, using a specialized microlens array in front of a standard photodetector such as a CCD or CMOS detector. The OA system converts the captured information to plenoptic data using the photodetector. The plenoptic data also includes a random key downloaded from an authentication server as metadata, This random key influences the subsequent optical processing of the incoming light and is used as an identifier of the plenoptic data. The OA system then uploads the plenoptic data to the authentication server, Path 2 leads to an optical hash generator to generate an optical hash of the light. The optical hash generator inputs the incoming light and generates an optical hash of the light using the random key. Like a hash of a text document is evidence of the content of the document, an optical hash is evidence of the content of an image. The OA system converts the generated optical hash to digital data in the form of a digital optical hash (DOH) using, for example, a CMOS detector. Like the plenoptic data, the DOH also includes the random key as metadata. The OA system then uploads the DOH to the authentication server.

When the authentication server receives the upload of the DOH, it calculates the time difference between when it transmitted the random key and when it received the upload. In addition, the authentication server compares the uploaded plenoptic data and DOH to determine whether they were generated from the same light (i.e., whether they represent the same image). If the plenoptic data and DOH are found to be generated from the same light, and the time of the upload is within a certain threshold time from the sending of the random key (e.g., not enough time to generate a forgery), the authentication server authenticates the image by generating a seal of authenticity that a user can use to verify the image's authenticity (e.g., through a smartphone app or browser plugin) when the user receives or disseminates the image.

The OA system allows for provable authentication of images (e.g., photos and videos) that can be demonstrated to the world at large using cryptography or watermarking. This gives credibility to image evidence crucial to the fields of journalism, activism, law enforcement, insurance industry, intelligence community, and others, Unlike other digital forensics and deepfake detection techniques, the OA system is not software-based or algorithm-specific but is based on fundamental principles of optical computing. As such, the OA system is not only a general solution, but is robust to any newly developed algorithms and unlikely to be defeated by any form of physical sabotage or reverse engineering.

In some embodiments, in order to increase the resolution of the plenoptic data, the light impinging on the photodetector may be subdivided into smaller, spatially distinct subsets. These subsets may each in turn be directed onto the photodetector with adjustable optics. A number of sub-images, thus measured in rapid succession, may be digitally stitched together into a larger image of high resolution.

In some embodiments, the optical hash generator includes an optical scatterer. The purpose of the optical scatterer is to subdivide the incoming light into a plethora (e.g., 10 billion) of individual light rays, each with a unique angle and location, while maintaining the intensity and color composition information of the light. The angle and location of each light ray is determined by a random key downloaded from the authentication server just moments prior. In this way, the light ray angle and location information are effectively "signed" by the random key and impossible to predict before receiving the key. The random key space should be sufficiently large such that guessing a random key would take an unreasonable amount of time (e.g., hundreds of years). This prevents a forger from guessing the random key and simulating the angles and locations of the light rays ahead of time.

In some embodiments, the optical scatterer includes a lens and a holographic plate. The lens focuses the incoming light onto the holographic plate, which then splits the incoming light into individual light rays, each containing tens of millions of photons. A holographic plate is an optical component with gratings that split and diffract light into numerous light rays travelling in different directions. The gratings act as dispersive elements in that when the light strikes a grating, the light spreads as if it originated from many point sources. The directions of the light rays depend on the spacing and curvature of the gratings, which can be controlled by changing the angle/orientation of the holographic plate. The optical scatterer uses the random key to set the angle/orientation of the holographic plate which would in turn determine the angles and locations of the light rays. Optically replicating, for example, 10 billion independent angles and locations of the light rays exiting the optical scatterer without the original object being photographed requires at least 10 billion operations. Given that the fastest high-speed spatial light modulators can perform about 2 billion operations per second, optically replicating the light rays coming out of the optical scatterer within 1 millisecond, for example, would require using 5,000 coordinated spatial light modulators. This makes forging of the 10 billion light rays exiting the optical scatterer without the original light rays virtually impossible.

In some embodiments the optical scatterer includes a mirrored surface that has a precisely textured surface pattern of angles (e.g., with a resolution of 1 micron). The texturing may result in an array of flat mirrored pixels (e.g., each 1 micron by 1 micron in size) each at a randomly determined, though known, angle relative to the bulk. Light focused onto this mirrored surface (with a lens) is deterministically scattered (subdivided) into a plurality of rays, each encoded (in its resulting location and angle) by the location in which it impinged on the mirrored surface and the corresponding mirrored pixel angle from which it reflected. This mirrored surface may be rotated in response to the random key, thus effectively "signing" the reflected light with the random key.

In some embodiments, the optical hash generator also includes an optical scrambler (e.g., an optical computer). The optical scrambler inputs the light rays exiting the optical scatterer and modulates the intensity of each light ray as it traverses a series of filters stacked on top of one another based on its angle and location. Each filter includes unique attenuating pixels of varying shades that are parallel to one another. The pixels (or some subset of the pixels) have tunable light attenuation coefficients. The optical scrambler determines these coefficients in real time using the downloaded random key. For example, analog electronics could be wired in a unique circuit to each pixel so that each pixel's attenuation coefficient can be rapidly tuned by an electronic signal in response to the random key. Each light ray takes a unique path through a different set of pixels based on its angle and location. As a light ray passes through a series of attenuating pixels (one at each filter), its intensity is attenuated in accordance with the specific pixel attenuation coefficient.

Although these operations can be rapidly performed by the optical scrambler due to the fast speed at which photons travel, they would require more floating point operations per second (FLOPS) than possible with the fastest supercomputers if simulated on an electronic computer in a short period of time. The attenuation of a light ray through a pixel can be tracked as a multiplication (or one floating point operation) of the light ray's initial intensity and a function of the attenuation coefficient of the pixel. As each light ray is independent, simulating the result of all of the light rays through all of the filters requires a large number of FLOPS given by the following equation:

$$Q = \frac{(B)(L)}{t}$$

where Q is the minimum requisite number of FLOPS, B is the number of independent rays, L is the number of filters in the optical scrambler, and t is the threshold time for the computation. For example, assuming that 10 billion independent light rays enter the optical scrambler, that each filter is 1 micron thick, and that the maximum allowable processing time is 1 millisecond, simulating light rays through a stack of 100,000 filters would require computational resources in excess of 1 exaFLOPS. Likewise, simulating light rays through a stack of 100 filters would necessitate computational resources in excess of 1 petaFLOPS.

Moreover, the number of possible combinations of attenuating pixels that an average light ray will interact with is given by the following equation:

$$V = p^L \left( \frac{L!}{\left[\left(\frac{L}{p}\right)!\right]^p} \right)^{-1}$$

where V is the number of distinct combinations the pixels can take on (as traced by a single light ray), p is the number of distinct attenuation coefficients each pixel can assume, and L is the number of filters in the optical scrambler. Each distinct attenuation coefficient may be mapped to a distinct prime number. Assuming each DOH simulation on an electronic computer takes more than 1 millisecond, simulating, for example, more than $10^{12}$ possible combinations for a single input image would take over 100 years, an unreasonable amount of time for the forger to expend in preparation. In this way, the OA system ensures that forgeries cannot be prepared in advance using computer simulation without knowledge of the random key.

In some embodiments, the OA system includes a CMOS detector to capture the optically processed (i.e., scattered and scrambled) light rays (as represented by an optical hash) and digitize information contained in the optical hash to generate a DOH. Due to the finite resolution of CMOS detectors (generally less than 100 megapixels), the OA system needs to condense the light rays output from the optical scrambler. For example, the OA system may condense approximately 10 billion independent light rays onto 100 million detector pixels, yielding an average of 100 independent light rays contributing to each detector pixel value. Information is irrecoverably lost in this process, but not to the extent that it hinders the authentication protocol described above. Alternatively, the OA system may divide the optical hash representing the overall output light rays into many (e.g., 100) sub-hashes, each of which can be converted to a separate DOH and then digitally stitched together to preserve the information content.

In some embodiments, when the authentication server checks whether the DOH was generated from the same light as the plenoptic data, the authentication server may randomly select the data from a small number of detector pixels from the DOH to spot check against the plenoptic data. During the spot check, the authentication server identifies which light rays could reach those detector pixels and uses an electronic computer to simulate their paths and attenuations through the optical scrambler. The authentication server needs to check only a small fraction of the overall detector pixels to authenticate an image with high confidence (e.g., a 5-sigma level of confidence). The precise number of detector pixels that must be spot checked depends on the resolution of the CMOS detector (both spatial and RGB intensities), the number of individual light rays, and the dimensions and number of layers of the optical scrambler. To generate a forgery that would be sure to pass all possible spot checks, a forger would have to simulate all of the light rays (not knowing which detector pixels will be selected since the detector pixels to spot check are selected randomly) and do so in a short time duration (e.g., 1 millisecond). In this way, producing a real-time forgery of sufficient detail is technologically precluded.

In some embodiments, a seal of authenticity may be implemented using a number of well-established techniques, including watermarking, providing a digital signature to accompany the image or a hash of the image, or publishing a database of hash values corresponding to authenticated images (e.g., to a blockchain). The seal of authenticity may allow for a small set of permissible edits (e.g., cropping) to the image while maintaining its authenticated status. When a user receives an image, the user can use the seal of authenticity to verify the image's authenticity. For example, if the seal of authenticity is a digital signature, the user may verify it using the public key of the authentication server that signed the image. As another example, the user may compute a hash of the image and check the hash against a published database of approved hash values to see if the hash matches any of the approved hash values.

In some embodiments, in order to prevent slow upload speeds from causing the total processing time (i.e., the time between the sending of the random key and the upload of the DOH) to exceed the threshold time, the OA system may compute a hash of the DOH using a hash function (e.g., SHA 256) and upload the hash of the DOH instead. The OA system can then upload the DOH at a later time, upon which the authentication server can compare the hash of the DOH to the previously uploaded hash value to ensure that no alterations were made after the hash upload. This could significantly reduce the amount of information uploaded in real time while ensuring that the DOH cannot be altered after the fact.

In some embodiments, the OA system may direct the image capturing device to take a series of images in rapid succession (e.g., 1000 photos over the course of 1 second). The OA system can group the DOHs of these images as a single package, compute a hash of this total package, and upload the hash to reduce effects of the upload latency. The authentication server can then check whether the time of the hash upload is within the number of images (e.g., 1000) times the threshold time from the sending of the first random key. In some embodiments, the number of images whose DOHs are to be grouped together may be set by a user (e.g., via a menu of the image capturing device) or downloaded from the authentication server. In some embodiments, the image capturing device may be configured to determine that number automatically based on the upload speeds. After uploading the hash of the package, the OA system can upload the individual DOHs later without time constraints. When the authentication server receives the DOHs, it can spot check them to ensure that they are generated from the original light that entered the image capturing device.

In some embodiments, authentication of an image may be performed using a distributed ledger without the need of a centralized trusted authority. The distributed ledger may be a blockchain or non-blockchain distributed ledger. A random number with a timestamp may be provided by an oracle, recorded as a transaction in the distributed ledger, and broadcast to image capturing devices. An oracle is a third-party service that provides external data (e.g., a random number) to a distributed ledger in a secure and trusted manner. The authentication server can function as an oracle to provide a random number to the distributed ledger. After a DOH is created, its hash along with a timestamp may be recorded as a transaction in the distributed ledger. The DOH and the plenoptic data are eventually recorded in the distributed ledger. The transactions containing the random number with its timestamp, hash with its timestamp, DOH, and plenoptic data can then be used to authenticate the image, for example, by a smart contract that implements the authentication protocol. A forged transaction would need to include a forged hash with a timestamp, a forged DOH, and forged plenoptic data. Such a forged transaction would be rejected by the smart contract because the timestamp of the forged hash would either necessarily be in the past or not satisfy the threshold time because it is too late.

In some embodiments, the OA system may employ non-interactive timestamps, rather than the interactive timestamps as described above. A timestamp guarantees that designated information could not have been altered after the timestamp was generated based on evidence (e.g., hash) of the designated information. Interactive timestamps require the party generating (or in possession of) the designated information to provide (e.g., upload) the evidence of the designated information to a third party (e.g., authentication server) to create the timestamp. Non-interactive timestamps, in contrast, do not require the party generating the designated information to provide the evidence to a third party to create the timestamp. Rather, with non-interactive timestamps, the party generating the evidence of the designated information creates the timestamp, which later can be provided to a third party. The third party can use the evidence and timestamp to ensure that the designated information existed prior to the creation of the timestamp and was not altered after the timestamp was created.

In some embodiments, the OA system employs quantum non-interactive timestamps. Quantum non-interactive timestamps are based on the no-cloning theorem for quantum particles, which states that it is impossible to create an exact copy (i.e., that preserves quantum information) of a particle in an arbitrary unknown quantum state (while maintaining the quantum state of the original particle). Thus, quantum information of a photon (e.g., polarization state) cannot be arbitrarily copied to another photon (without erasing information stored in the original photon). Moreover, when a measurement is taken of a photon, quantum information stored in the photon may be destroyed. In addition, quantum non-interactive timestamps also rely on the principle that is difficult to store quantum states for an arbitrary period and that the lifespan of a quantum state is relatively short.

In some embodiments, when quantum non-interactive timestamps are used, the OA system may rely on an external source such as an oracle that encodes information in quantum states of photons that are streamed to the OA system. The oracle may use non-orthogonal quantum states to encode the information such that quantum indeterminacy prevents the encoded information from reliably and consistently being extracted without knowledge of the basis in which the information is encoded. Upon receiving a photon (or set of photons), the OA system measures an observable of the quantum state(s) (e.g., representing 0 or 1) of the photon(s) in a specific basis (initially a known basis). The OA system updates a random key based on the observable measurement result, configures the optical hash generator based on the updated random key, and collects an image resulting in the generating of a DOH. The OA system then stores the observable measurement result, basis, random key, and the DOH as a timestamp for the image. The OA system then identifies a new basis (for a subsequent photon measurement) that is a function of the DOH and repeats the process (referred to as a cycle) for the next photon(s) received. The OA system thus implements a feedback loop in which the DOH of each image (cycle) is used to determine the specific basis in which to measure a subsequent photon or photons. The result of this measurement is in turn used to adjust the random key and reconfigure the optical hash generator for a subsequent DOH and image (cycle), Eventually, the OA system uploads the images and for each cycle, the observable measurement result, basis, random key, and DOH to the authentication server. The authentication server retrieves from the oracle the basis and the encoded information for each photon transmitted. To authenticate the first image, the authentication server uses the initial random key and encoded information of the first photon to perform a spot check on the image and the DOH given the updated random key. To authenticate the second image (cycle) (and subsequent images (cycles)), the authentication server identifies the next basis used by the OA system based on the DOH of the first image and updates the random key based on the observable measurement result. If the next basis matches the basis used by the oracle to encode the information for the second photon, but the observable measurement result and the encoded information do not match, then a forgery is being attempted. If a forgery is not being attempted, the authentication server performs a spot check on the image and the DOH given the random key and repeats this process for each image (cycle).

In some embodiments, the oracle may encode information in a photon using polarization state. The oracle may make use of non-orthogonal states. For example, when a rectilinear basis is used, horizontal polarization may represent a zero, and a vertical polarization may represent a one. When a diagonal basis is used, a minus 45 degrees polarization may represent a zero, and a positive 45 degrees may represent a one. The oracle may also choose a basis (e.g., randomly) and encode a zero or a one in the photon using the basis. When the OA system receives a photon and uses the same basis as used by the oracle, the measurement is accurate. If, however, the OA system uses a different basis, then the measurement will be random (e.g., 0 or 1), giving a measurement result equivalent to the transmitted bit 50% of the time.

Quantum non-interactive timestamps make it infeasible for a forger to measure a sequence of photons using random bases and later generate the correct timestamp for a forged image. Under the condition that the input data (e.g., image prior to going through the optical hash generator) remains constant over the timespan of the cycles, to generate the correct quantum non-interactive timestamp for the set of cycles, the forger would need to generate a sequence of DOHs in which each hash is based on all prior DOHs and on the photon measurement results (because of the feedback loop). The forged DOHs, however, would need to specify the random bases in the exact order as used when the forger measured the photons. The probability of the DOHs specifying such an exact order decreases exponentially with the number of cycles. Thus, preparing a forgery that would pass the authentication server tests has a computational expense that grows exponentially with the number of cycles required.

In some embodiments, quantum non-interactive timestamps may also be implemented on data types other than images such as word documents, database records, messages, and so on (or portions of them such as chapters, paragraphs, sentence, fields, areas of an image or aggregates of them or their portions). Each image, word document, database record, message, and so on and portion or aggregation of them may be referred to as a collection of data. Under these implementations, the optical hash generator may be replaced by another keyed hash function. Under these implementations, the authenticating server may perform a keyed hash operation to authenticate the timestamp instead of spot checking. Under these implementations, an automated process may establish a feedback loop wherein the quantum measurement result alters a keyed hashing of digital data, which produces a digital hash (DH). The DH in turn is used to determine the basis of one or more subsequent quantum measurements, closing the feedback loop.

Quantum storage techniques (e.g., photonic memory) have short, finite lifespans when preserving a quantum particle or quantum information. As soon as this lifespan is exceeded for a photon, the quantum state decoheres or collapses, the information is lost, and the probability of a successful forgery decreases exponentially with the number of remaining cycles. For implementations that do not use an optical hash generator, this short lifespan sets the margin of error for the timestamp.

For implementations that do use an optical hash generator, the margin of error for the timestamp may be reduced with adjustable parameters. A forger would need to store the photons for a minimum photon storage time that is a function of the quantum measurement rate (or photon transmission rate), the computational time necessary for forging a DOH through a simulation, and the number of cycles in the sequence. To help prevent such forgeries, the OA system may increase the number of cycles in the sequence so that the minimum quantum information storage time is much longer than the quantum information storage lifespan.

FIG. 1 is a schematic diagram that illustrates components of an OA system in some embodiments. The OA system 110, which may be embedded in an image capturing device such as a camera, is connected to an authentication server 120 via a communication channel 130, which may be any kind of local, wide area, wired, or wireless network (e.g., the Internet). The image capturing device may be equipped to wirelessly download and upload information via the communication channel. For example, the image capturing device may have built-in Wi-Fi or interface with a smartphone via Bluetooth or cellular. The authentication server authenticates an image using image data uploaded from the OA system. The authentication server also generates and distributes a random key that the OA system uses to perform optical processing. In some embodiments, instead of receiving a random key from the authentication server, the image capturing device may include a security token (similar to an RSA SecureID token) that creates a random number at fixed intervals using a built-in clock and the token's factory-encoded seed that is different for each token. The token hardware may be designed to be tamper-resistant to deter reverse engineering (e.g., using Intel SGX technology).

When a user takes a photo of an object using an image capturing device, light that is reflected and/or emitted from the object enters the image capturing device through a lens 111. The OA system includes a beam splitter 112 that splits the incoming light into two paths (path 1 and path 2). In some embodiments, the OA system may not have a beam splitter to split the input light. Instead, the OA system may rapidly redirect the light down path 1 at one time ($t_1$) and path 2 at a subsequent time ($t_2$) using a rotatable mirror. Path 1 leads to a plenoptic (light field) camera 113 that captures the entire vector field of the light, including its intensity and direction, using a specialized microlens array in front of a standard photodetector such as a CCD or CMOS detector. The OA system then converts the captured information to plenoptic data using the photodetector and uploads the plenoptic data to the authentication server via the communication channel. Path 2 leads to an optical hash generator 114 that includes an optical scatterer 115 and an optical scrambler 116. The optical scatterer scatters (i.e., subdivides) the input light into a large number (e.g., 10 billion) of distinct light rays, each with a unique angle and location. The OA system sets the specific angle and location for each light ray using a random key downloaded from the authentication server. The OA system then directs the scattered light rays to the optical scrambler. The optical scrambler inputs the light rays exiting the optical scatterer and outputs an optical hash of the input light rays by performing complex optical processing. The OA system projects the resulting light rays (i.e., an optical hash) onto a CMOS detector 118 through a lens 117 to convert them to digital data (i.e., DOH). The OA system then uploads the DOH to the authentication server via the communication channel.

The computing systems (e.g., network nodes or collections of network nodes) on which the OA system and the other described systems may be implemented may include a central processing unit, input devices, output devices (e.g., display devices and speakers), storage devices (e.g., memory and disk drives), network interfaces, graphics processing units, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include high-performance computing systems, cloud-based servers, desktop computers, laptops, tablets, e-readers, personal digital assistants, smartphones, gaming devices, servers, and so on. For example, the simulations and training may be performed using a high-performance computing system, and the classifications may be performed by a tablet. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the OA system and the other described systems. The data transmission media are used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The OA system and the other described systems may be described in the general context of computer-executable instructions, such as program modules and components, executed by one or more computers, processors, or other devices. Generally, program modules or components include routines, programs, objects, data structures, and so on that perform tasks or implement data types of the OA system and the other described systems. Typically, the functionality of the program modules may be combined or distributed as desired in various examples. Aspects of the OA system and the other described systems may be implemented in hardware using, for example, an application-specific integrated circuit ("ASIC") or field programmable gate array ("FPGA").

Figure 2:
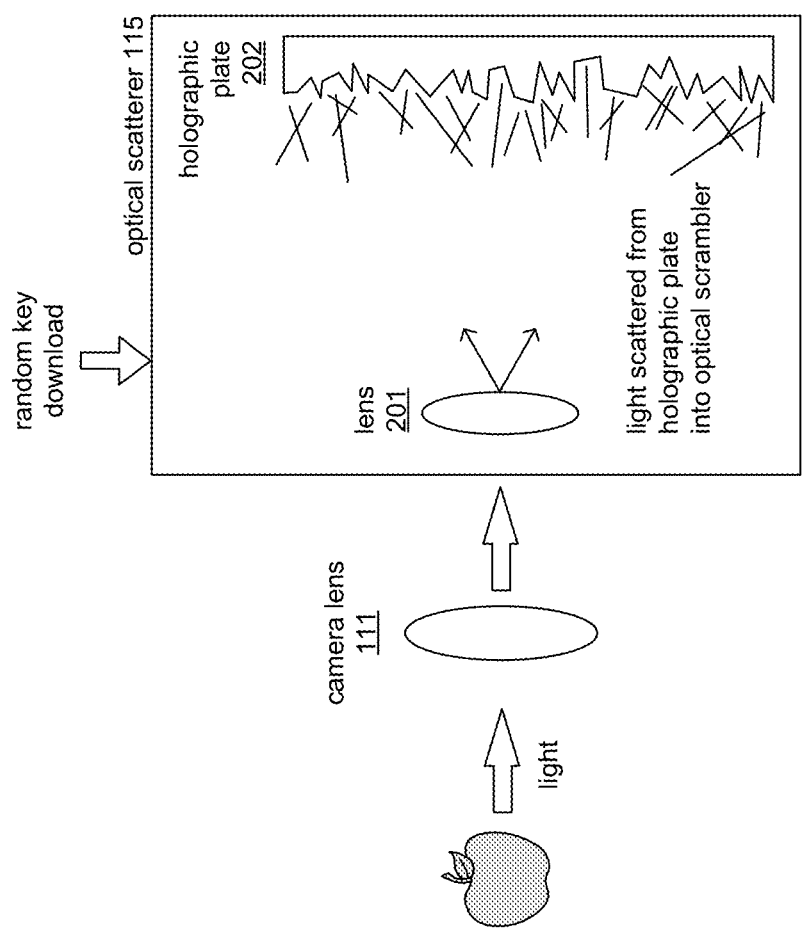
FIG. 2 is a schematic diagram that illustrates components of an optical scatterer in some embodiments.

FIG. 2 is a schematic diagram that illustrates components of an optical scatterer in some embodiments. The optical scatterer inputs the light reflected and/or emitted from an object being photographed and splits the light into a plethora (approximately 10 billion) of light rays that are deterministic but independent of one another, each with a unique angle and location. The optical scatterer includes a lens 201 and a holographic plate 202. The lens focuses the incoming light onto the holographic plate, which then splits the incoming light into individual light rays, each containing tens of millions of photons. The optical scatterer uses a random key downloaded from the authentication server to control the angle/orientation of the holographic plate which would in turn determine the angles and locations of the light rays bouncing off the holographic plate. In this way, the light ray angle and location information are effectively "signed" by the random key and impossible to predict before receiving the key.

Figure 3:
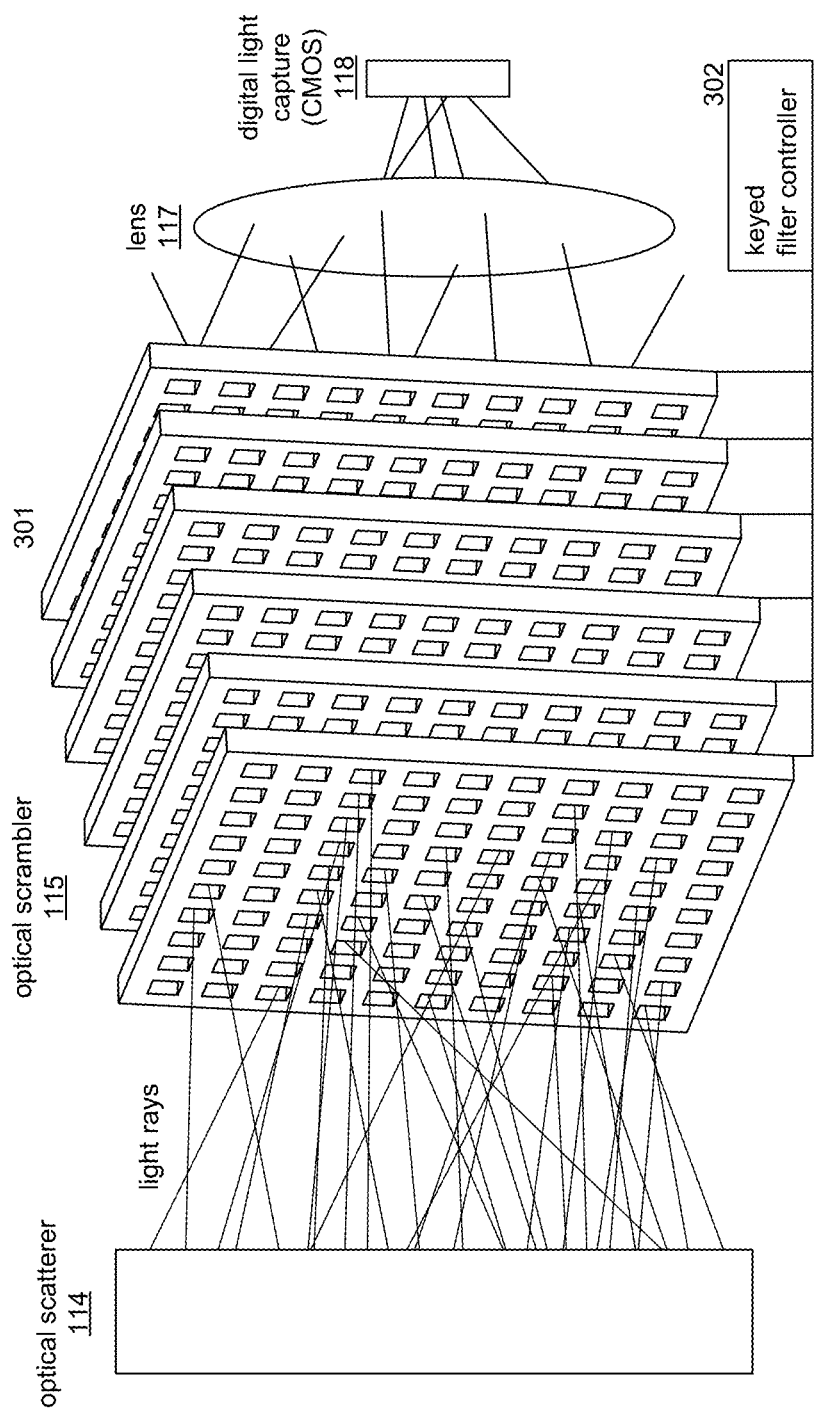
FIG. 3 is a schematic diagram that illustrates components of an optical scrambler in some embodiments.

FIG. 3 is a schematic diagram that illustrates components of an optical scrambler in some embodiments. The optical scrambler inputs the light rays exiting the optical scatterer and outputs an optical hash of the input light rays by performing complex optical processing. To perform this optical processing, the optical scrambler employs a series of filters 301 stacked on top of one another. Each filter includes unique attenuating pixels of varying shades that are parallel to one another. The pixels (or some subset of the pixels) have tunable light attenuation coefficients. The optical scrambler includes a keyed filter controller 302 that determines these coefficients in real time using the downloaded random key. The pixels can be wired together so that the keyed filter controller can rapidly tune each pixel's attenuation coefficient by adjusting voltage to each pixel based on the random key. Each light ray takes a unique path through a different set of pixels based on its angle and location. As a light ray passes through a series of attenuating pixels (one at each filter), its intensity is attenuated in accordance with the specific pixel attenuation coefficient. In some embodiments, these filters may be liquid crystal thin films. The light transmission through a liquid crystal thin film is tunable with an electric field. Upon exiting the stacked filters of the optical scrambler, the light rays are projected onto a CMOS detector through a lens to be converted to digital data (i.e., a DOH).

Figure 4:
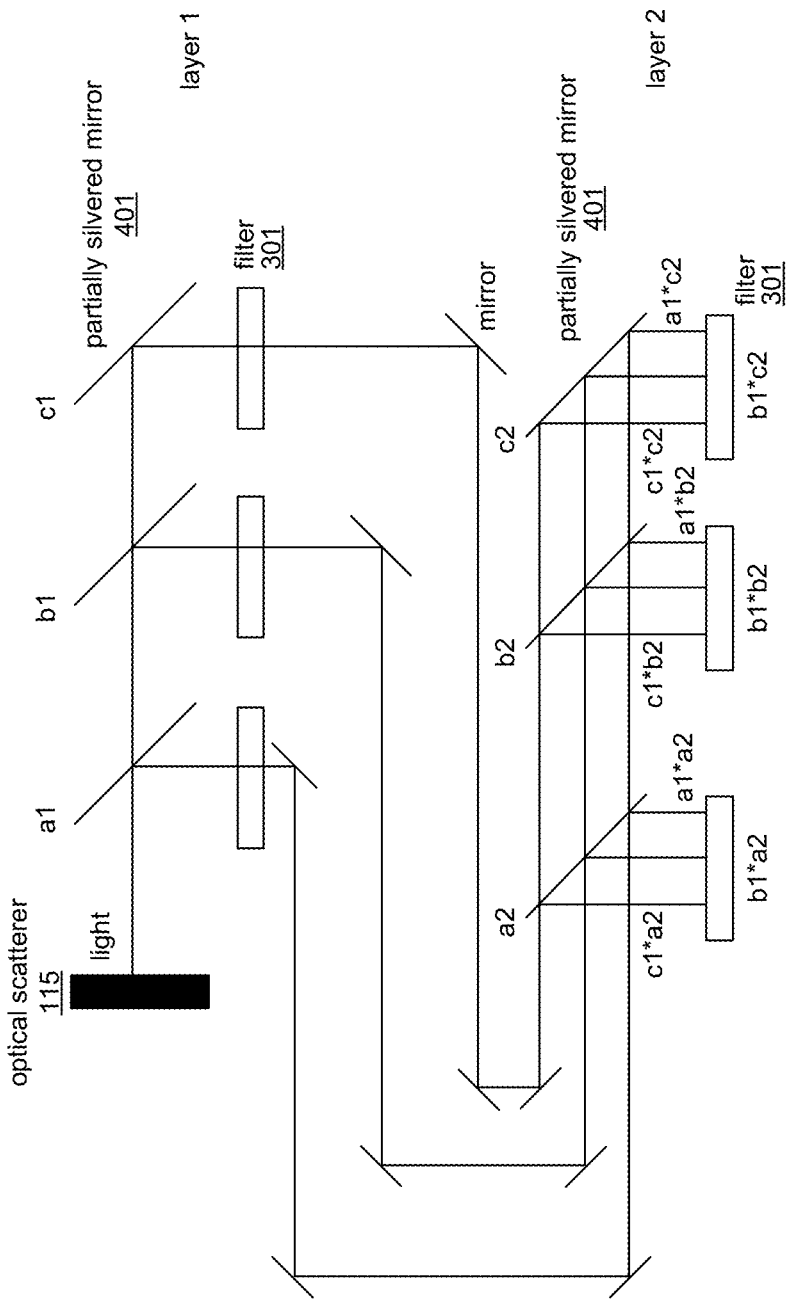
FIG. 4 is a schematic diagram that illustrates a configuration of light scrambling filters of the optical scrambler to reduce the number of filters in some embodiments.

FIG. 4 is a schematic diagram that illustrates a configuration of light scrambling filters of the optical scrambler to reduce the number of filters in some embodiments. The number of filters (and thus the thickness of the optical scrambler) can be reduced by staggering the filters in layers so that the light exiting the filters in one layer is projected onto all of the filters in the next layer simultaneously. A light ray exiting the optical scatterer is subdivided by a number of partially silvered mirrors 401 and goes through nine distinct filter paths. Therefore, simulating the outputs of this single light ray through only two layers of filters (each with three filters) would require computing the following nine multiplications (or floating point operations): a1*a2, a1*b2, a1*c2, b1*a2, b1*b2, b1*c2, c1*a2, c1*b2, and c1*c2, where each variable is a random prime number representative of the attenuation coefficient of the identified pixel. In general, the number of separate paths (and thus floating point operations) grows as $k^L$ where k is the number of filters in each layer and L is the number of layers. In this way, the computational complexity can be increased significantly without increasing the thickness of the optical scrambler very much.

Figure 5:
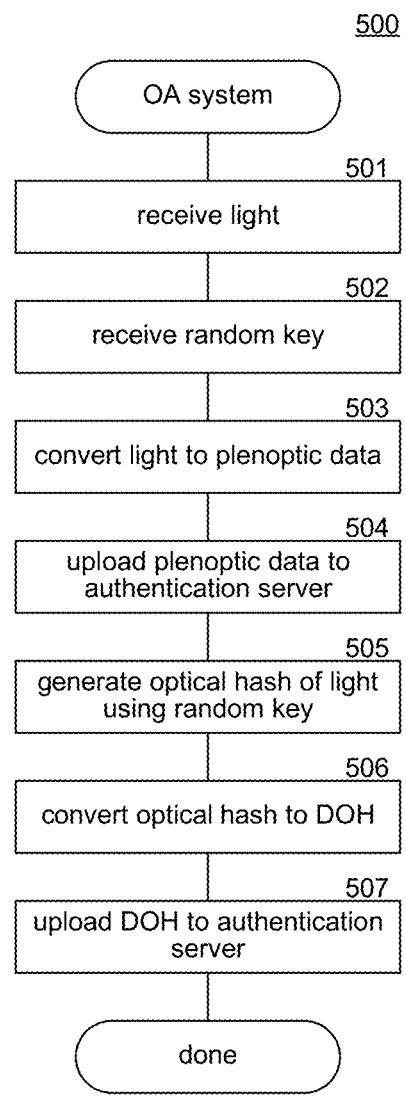
FIG. 5 is a flow diagram that illustrates the overall processing of the OA system in some embodiments.

FIG. 5 is a flow diagram that illustrates the overall processing of the OA system in some embodiments. An OA system 500, which may be embedded in a camera, generates authentication information for an image using optical computing. The OA system allows a remote authentication server to determine whether the information stored in an image entered into the camera in the form of light (as opposed to forgeries produced via computer simulation whose information entered the camera in the form of electronic signals). In block 501, the OA system receives light reflected and/or emitted from an object being photographed. In block 502, the OA system receives a random key from an authentication server that continuously transmits a random number that is updated with high frequency (e.g., once every 500 microseconds). In block 503, the OA system converts the received light to plenoptic data using a plenoptic camera and a photodetector (e.g., a CMOS detector). The plenoptic camera captures the full vector field of the light, including its intensity and direction, using a specialized microlens array. The photodetector converts the captured information to digital data (i.e., plenoptic data) to be uploaded to the authentication server. In block 504, the OA system uploads the plenoptic data to the authentication server. In block 505, the OA system generates an optical hash of the light by performing complex optical processing using the downloaded random key, The OA system generates the optical hash in two stages. In the first stage, the OA system scatters the light into a plethora of distinct light rays (approximately 10 billion), each with unique location, directionality, color spectrum, and intensity, by bouncing the light off a holographic plate. The random key determines the precise angle of the holographic plate which would in turn determine the angles and locations of the individual light rays. In the second stage, the OA system modulates the intensity of each light ray as it takes a unique path through a series of filters based on its location and directionality. Each filter includes unique attenuating pixels with tunable light attenuation coefficients. The OA system determines these coefficients in real time using the random key. For example, analog electronics could be wired in a unique circuit to each pixel so that each pixel's attenuation coefficient can be rapidly tuned by an electronic signal in response to the random key. In block 506, the OA system converts the generated optical hash to digital data in the form of a DOH. In block 507, the OA system uploads the DOH to the authentication server and then completes.

Figure 6:
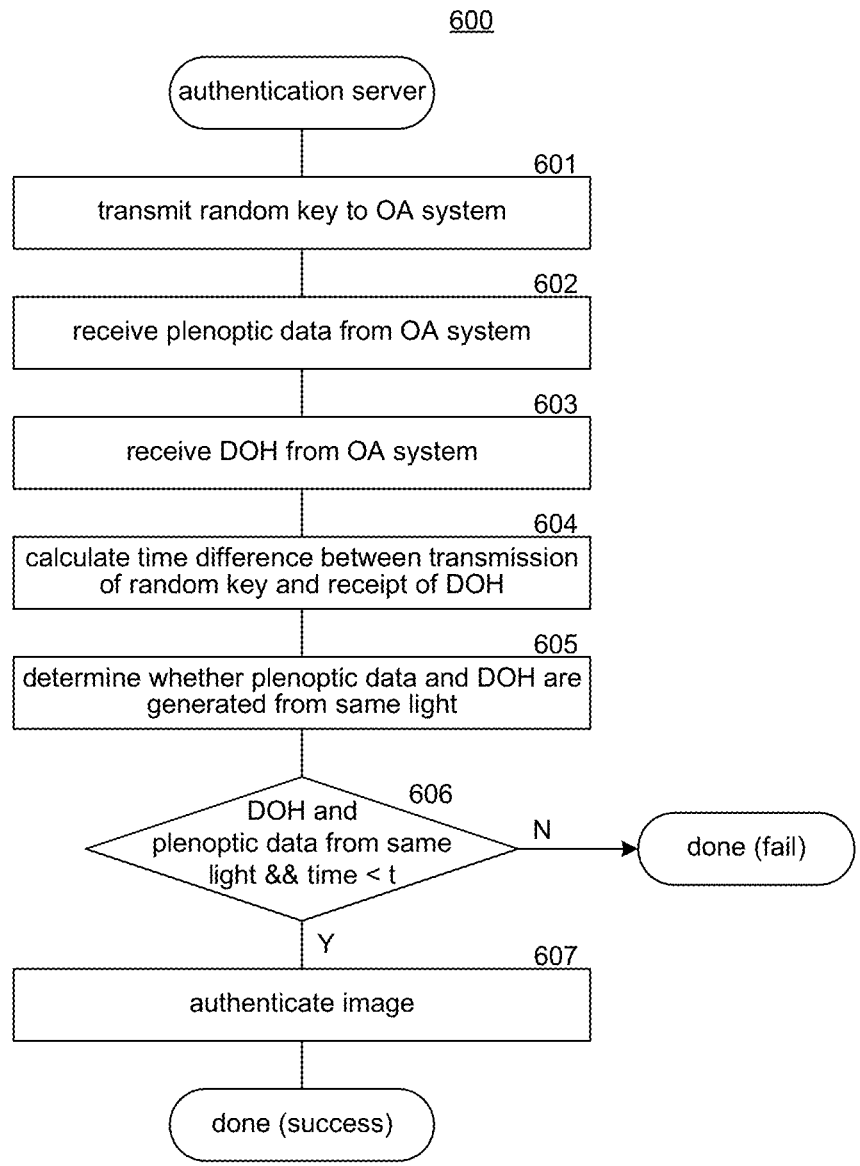
FIG. 6 is a flow diagram that illustrates the overall processing of an authentication server in some embodiments.

FIG. 6 is a flow diagram that illustrates the overall processing of an authentication server in some embodiments. The authentication server generates and distributes a random key that the OA system uses to perform optical processing. Additionally, the authentication server authenticates an image using image data uploaded from the OA system. In block 601, the authentication server transmits a random key to the OA system. The authentication server continuously transmits a new random number at high frequency (e.g., once every 500 microseconds). In block 602, the authentication server receives plenoptic data from the OA system. The plenoptic data is digital data containing information about the full vector field of the entering light captured by a plenoptic camera, including the intensity and direction. In block 603, the authentication server receives a DOH from the OA system. The DOH is digital data representing the optically processed (i.e., scattered and scrambled) light. When the authentication server receives the DOH, in block 604, the authentication server calculates the time difference between the transmission of the random key and the receipt of the DOH. This time difference represents the total processing time and determines the minimum computational power necessary for a forger to successfully forge an image via computer simulation. For example, dividing the number of floating operations required to simulate the optical processing by the total processing time puts a limit on the minimum computation power a forger would need. By setting this limit higher than the world's most powerful supercomputers, the authentication server may ensure that the resources to produce a forgery via computer simulation do not exist.

In block 605, the authentication server determines whether the plenoptic data and the DOH are generated from the same light (i.e., whether the plenoptic data and the DOH represent the same image). The authentication server does so by spot checking a small number of pixels from the DOH to ensure that it was generated from the correct optical processing applied to the plenoptic data. In decision block 606, if the total processing time is less than a threshold time, and the DOH is found to be generated from the same light as the plenoptic data, the authentication server continues at block 607, else the authentication server completes without authenticating the image. In block 607, the authentication server authenticates the image, for example, by generating a seal of authenticity to accompany the image. This seal may be a watermark, a digital signature, or a hash of the image. Alternatively or additionally, a database of hash values corresponding to authenticated images may be published (e.g., to a blockchain) to allow easy identification of the authenticated images. The seal of authenticity may allow for a small set of permissible edits (e.g., cropping) to the image while maintaining its authenticated status.

Figure 7:
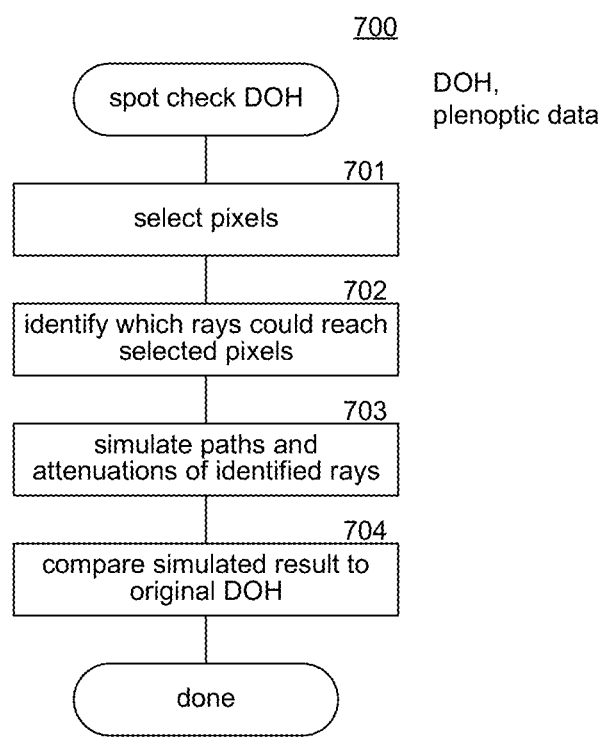
FIG. 7 is a flow diagram that illustrates the processing of a spot check DOH component of the authentication server in some embodiments.

FIG. 7 is a flow diagram that illustrates the processing of a spot check DOH component of the authentication server in some embodiments. The spot check DOH component 700 is invoked passing a DOH and corresponding plenoptic data that are generated and uploaded by the OA system, and verifies whether they were generated from the same light (i.e., represent the same image). In block 701, the component randomly selects a small number of pixels from the DOH to spot check. The precise number of pixels that must be spot checked depends on the resolution of the CMOS detector (both spatial and RGB intensities), the number of individual light rays, and the dimensions and number of layers of the optical scrambler. In general, the component needs to check only a small fraction of the overall pixels to authenticate an image with high confidence (e.g., a 5-sigma level of confidence) while an adversary (not knowing which pixels will be selected since the pixels are selected randomly) has to calculate the values of all pixels. Thus, the component needs to perform only a small percentage of the floating operations that an adversary would have to perform to create a passable forgery, which would take only a few seconds on a single core. In block 702, the component identifies which light rays could reach the selected pixels. In block 703, the component simulates paths and attenuations of the identified light rays through the optical scrambler. In block 704, the component compares the simulated result to the originally uploaded DOH. If they match, the DOH is considered to be generated from the same light as the plenoptic data.

Figure 8:
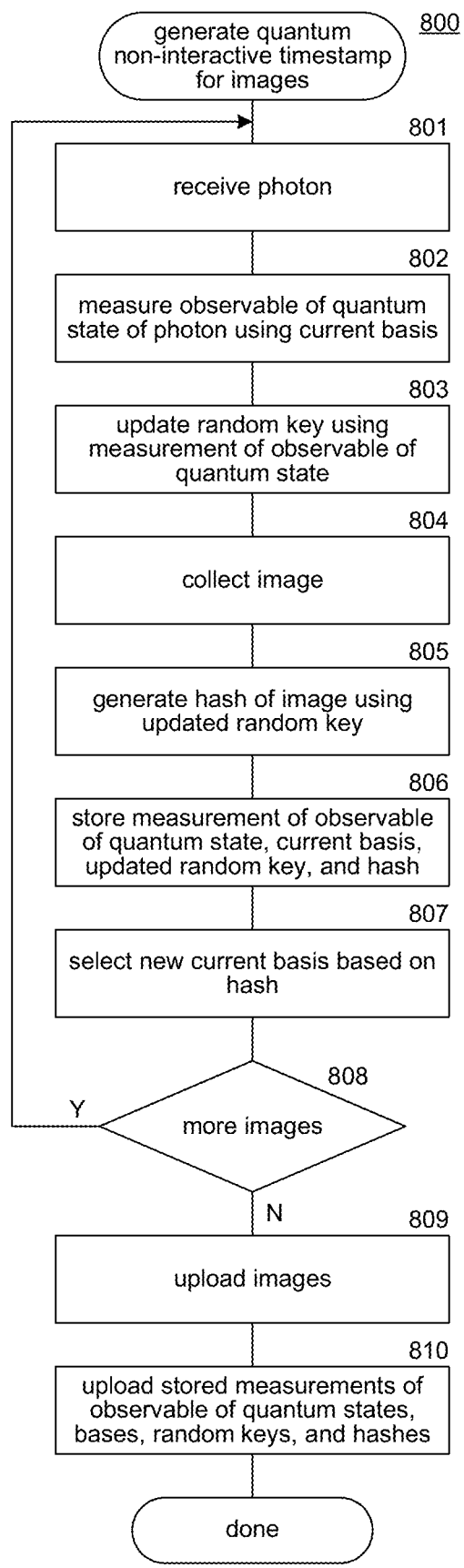
FIG. 8 is a flow diagram that illustrates the processing of a generate quantum non-interactive timestamp component of the OA system in some embodiments.

FIG. 8 is a flow diagram that illustrates the processing of a generate quantum non-interactive timestamp for images component of the OA system in some embodiments. The generate quantum non-interactive timestamp for images component 800 is invoked to collect images and generate a quantum non-interactive timestamp for the images, In block 801, the component receives a photon (e,g., from an oracle) via the atmosphere, fiber optics, and so on. In block 802, the component measures a quantum state of the photon using a current basis, which is known initially. In block 803, the component updates a random key based on the measured quantum state. The component may configure an optical hash generator based on the updated random key. In block 804, the component collects an image. In block 805, the component generates an optical hash of the image using the optical hash generator configured with the updated random key, In block 806, the component stores the measured quantum state, the current basis, the updated random key, and the optical hash in the OA system. The stored information serves as a timestamp for the image, In block 807, the component selects a new current basis based on the optical hash. In decision block 808, if more images are to be collected, then the component continues at block 801, else the component continues at block 809, In block 809, the component uploads the images (i.e., plenoptic data) to an authentication server. In block 810, the component uploads the stored quantum states, bases, random keys, and optical hashes and completes. Blocks 809 and 810 can be performed at much later time and not be performed at the time the images are collected and the quantum non-interactive timestamps are generated. Also, the images and quantum non-interactive timestamps can be uploaded at different times.

The following paragraphs describe various embodiments of aspects of the OA system. An implementation of the OA system may employ any combination of the embodiments. The processing described below may be performed by a computing system with a processor that executes computer-executable instructions stored on a computer-readable storage medium that implements the OA system.

In some embodiments, a method performed by one or more computing systems for generating authentication information for an image using optical computing is provided. The method receives light from an object, receives a random key from an authentication server, converts the received light to plenoptic data, uploads the plenoptic data to the authentication server, generates an optical hash of the received light using the random key, converts the generated optical hash to a digital optical hash, and uploads the digital optical hash to the authentication server. The method splits the received light into two paths using a beam splitter. Alternatively, the method can redirect the received light down a first path at one time and a second path at a subsequent time. The plenoptic data includes information about a full vector field of the light, including intensity and direction of the light, captured by a plenoptic camera. The method generates the optical hash by splitting the light into a plurality of light rays (each light ray having unique angle and location that are determined by the random key) and applying optical processing to the plurality of light rays. The light is split using a holographic plate whose angle is determined by the random key. The optical processing includes modulating intensity of each light ray as the light ray traverses a series of filters. Each filter includes a plurality of attenuating pixels. Each pixel has a tunable attenuation coefficient. The intensity of each light ray is attenuated in accordance with the attenuation coefficient of each pixel that the light ray passes through, The attenuation coefficient of each pixel is determined by the random key. Each pixel is wired with a circuit and the attenuation coefficient of each pixel is controlled by an electronic signal to the circuit based on the random key. The filters can be liquid crystal tunable filters. The conversion of the optical hash to the digital optical hash can be done by a CMOS detector. In some embodiments, before converting the optical hash to the digital optical hash, the method condenses the optical hash to fit a resolution of the CMOS detector. The method coverts the optical hash to the digital optical hash by dividing the optical hash into a plurality of sub-hashes, converting each sub-hash to a digital optical hash, and stitching together the digital optical hashes into a single digital optical hash.

In some embodiments, one or more computing systems for generating authentication information for an image using optical computing are provided. The one or more computing systems include one or more computer-readable storage mediums storing computer-executable instructions and one or more processors for executing the computer-executable instructions stored in the one or more computer-readable storage mediums. The computer-executable instructions control the one or more computing systems to receive light from an object, access a random key, convert the received light to plenoptic data, upload the plenoptic data, generate an optical hash of the received light using the random key, convert the optical hash to a digital optical hash, and upload a representation of the digital optical hash, The representation of the digital optical hash can be the digital optical hash itself or a hash of the digital optical hash. The plenoptic data and the representation of the digital optical hash are uploaded to an authentication server. In some embodiments, the plenoptic data and the representation of the digital optical hash are uploaded to a distributed ledger. The random key can be downloaded from the authentication server, provided by an oracle and stored in a distributed ledger, or generated using a security token embedded in an image capturing device. In some embodiments, the oracle is the authentication server. In some embodiments, the computer-executable instructions further control the one or more computing systems to group a number of digital optical hashes as a single package and upload a hash of the package. The number of digital optical hashes to be grouped can be set by a user, downloaded from the authentication server, or determined automatically by the one or more computing systems based on upload speeds.

In some embodiments, a method performed by one or more computing systems for authenticating an image is provided. The method transmits a random key to an image capturing device, receives plenoptic data from the image capturing device, receives a digital optical hash from the image capturing device, calculates a time difference between the transmission of the random key and the receipt of the digital optical hash, determines whether the plenoptic data and the digital optical hash are generated from same light, and when the time difference is less than a threshold time and when the plenoptic data and the digital optical hash are generated from the same light, generates a seal of authentication for the image. The determination of whether the plenoptic data and the digital optical hash are generated from the same light includes spot checking the digital optical hash, where the spot checking comprises randomly selecting a plurality of pixels from the digital optical hash, identifying light rays that could reach the selected pixels, simulating paths and attenuations of the identified light rays through an optical scrambler, and comparing a result of the simulation to the digital optical hash. The threshold time is set such that producing a forgery via computer simulation is impossible even with a supercomputer, The seal of authenticity includes a watermark, a digital signature, or a hash of the image. In some embodiments, a database of hash values corresponding to authenticated images is published to allow easy identification of the authenticated images.

In some embodiments, one or more computing systems for authenticating an image are provided. The one or more computing systems include one or more computer-readable storage mediums storing computer-executable instructions and one or more processors for executing the computer-executable instructions stored in the one or more computer-readable storage mediums. The computer-executable instructions control the one or more computing systems to access a random key, access plenoptic data, access a digital optical hash, and verify whether the plenoptic data and the digital optical hash are generated from same light using the random key. The computer-executable instructions further control the one or more computing systems to access a timestamp of the random key, access a timestamp of the digital optical hash, calculate a time difference between the timestamp of the random key and the timestamp of the digital optical hash, and verify whether the time difference is less than a threshold time. In some embodiments, the timestamps are non-interactive timestamps. In some embodiments, the timestamps are quantum non-interactive time stamps. In some embodiments, the random key, the plenoptic data, and the digital optical hash are recorded in a distributed ledger. In some embodiments, the verification of whether the plenoptic data and the digital optical hash are generated from the same light is performed by a smart contract.

In some embodiments, a method performed by one or more computing systems for generating a quantum non-interactive timestamp for a plurality of images is provided. For each of the plurality of images, the method receives a photon with a quantum state that encodes information for a basis specified by an external source, measures an observable of the quantum state of the photon using a current basis, updates a random key based on the measured observable of the quantum state, generates an optical hash of the image using the updated random key, stores the measured observable of the quantum state, the current basis, the updated random key, and the optical hash as a timestamp for the image, and selects a new current basis based on the optical hash. The stored measured observables of quantum states, bases, random keys, and optical hashes form the quantum non-interactive timestamp for the images. In some embodiments, the external source is an oracle. In some embodiments, the quantum state is a polarization state of the photon. In some embodiments, the information encoded in the photon is encoded in one of a plurality of non-orthogonal quantum states. In some embodiments, the generation of the optical hash is performed by an optical hash generator.

In some embodiments, one or more computing systems for generating a quantum non-interactive timestamp for a plurality of collections of data are provided. The one or more computing systems include one or more computer-readable storage mediums storing computer-executable instructions and one or more processors for executing the computer-executable instructions stored in the one or more computer-readable storage mediums. The computer-executable instructions control the one or more computing systems to, for each of the plurality of collections of data, receive one or more photons with one or more quantum states that encode information for a basis specified by an external source, measure an observable of the quantum states of the one or more photons using a current basis, update a random key based on the measured observable of the quantum states, generate a hash of the collection of data using the updated random key, store the measured observable of the quantum states, the current basis, the updated random key, and the hash as a timestamp for the collection of data, and select a new current basis based on the hash. In some embodiments, the generation of the hash is performed by a keyed hash function. In some embodiments, the collection of data is of a data type selected from the group consisting of an image, a word document, a database record, and a message. In some embodiments, the collection of data is of a data type selected from the group consisting of a hash of an image or a set of images, a hash of a word document or a set of word documents, a hash of a database record or a set of database records, and a hash of a message or a set of messages.

In some embodiments, one or more computing systems for authenticating collections of data having quantum non-interactive timestamps are provided. The one or more computing systems include one or more computer-readable storage mediums storing computer-executable instructions and one or more processors for executing the computer-executable instructions stored in the one or more computer-readable storage mediums. The computer-executable instructions control the one or more computing systems to for each collection of data, access the collection of data and a quantum non-interactive timestamp for the collection of data (the quantum non-interactive timestamp including a timestamp observable of the quantum state of a photon, a timestamp basis, a timestamp random key, and a timestamp hash), access an encoded quantum state of the photon and an encoded basis that are associated with the collection of data, indicate an error based on the timestamp observable of the quantum state not matching the encoded quantum state when the timestamp basis matches the encoded basis, generate an authentication random key based on the timestamp observable of the quantum state, generate an authentication hash of the collection of data using the authentication random key, indicate an error based on the authentication hash not matching the timestamp hash, update an authentication basis based on the authentication hash, and indicate an error based on a subsequent timestamp basis not matching the updated authentication basis.

Distributed ledgers are currently being used in a wide variety of applications. The bitcoin system is an example of a distributed ledger. The bitcoin system was developed to allow electronic cash to be transferred directly from one party to another without going through a financial institution, as described in the white paper entitled "Bitcoin: A Peer-to-Peer Electronic Cash System" by Satoshi Nakamoto. A bitcoin (e.g., an electronic coin) is represented by a chain of transactions that transfers ownership from one party to another party. To transfer ownership of a bitcoin, a new transaction is generated and added to a stack of transactions in a block. The new transaction, which includes the public key of the new owner, is digitally signed by the owner with the owner's private key to transfer ownership to the new owner, as represented by the new owner public key. The signing by the owner of the bitcoin is an authorization by the owner to transfer ownership of the bitcoin to the new owner via the new transaction. Once the block is full, the block is "capped" with a block header that is a hash digest of all the transaction identifiers within the block. The block header is recorded as the first transaction in the next block in the chain, creating a mathematical hierarchy called a "blockchain." To verify the current owner, the blockchain of transactions can be followed to verify each transaction from the first transaction to the last transaction. The new owner need only have the private key that matches the public key of the transaction that transferred the bitcoin. The blockchain creates a mathematical proof of ownership in an entity represented by a security identity (e.g., a public key), which in the case of the bitcoin system is pseudo-anonymous.

To ensure that a previous owner of a bitcoin did not double-spend the bitcoin (i.e., transfer ownership of the same bitcoin to two parties), the bitcoin system maintains a distributed ledger of transactions. With the distributed ledger, a ledger of all the transactions for a bitcoin is stored redundantly at multiple nodes (i.e., computers) of a blockchain network. The ledger at each node is stored as a blockchain. In a blockchain, the transactions are stored in the order that the transactions are received by the nodes. Each node in the blockchain network has a complete replica of the entire blockchain. The bitcoin system also implements techniques to ensure that each node will store the identical blockchain, even though nodes may receive transactions in different orderings. To verify that the transactions in a ledger stored at a node are correct, the blocks in the blockchain can be accessed from oldest to newest, generating a new hash of the block and comparing the new hash to the hash generated when the block was created. If the hashes are the same, then the transactions in the block are verified. The bitcoin system also implements techniques to ensure that it would be infeasible to change a transaction and regenerate the blockchain by employing a computationally expensive technique to generate a nonce that is added to the block when it is created. A bitcoin ledger is sometimes referred to as an Unspent Transaction Output ("UTXO") set because it tracks the output of all transactions that have not yet been spent.

Although the bitcoin system has been very successful, it is limited to transactions in bitcoins. Other blockchains have be developed to support transactions of any type, such as those relating to the sale of vehicles, sale of financial derivatives, sale of stock, payments on contracts, and so on. Such transactions use identity tokens to uniquely identify something that can be owned or can own other things. An identity token for a physical or digital asset is generated using a cryptographic one-way hash of information that uniquely identifies the asset. Tokens also have an owner that uses an additional public/private key pair. The owner public key or hash of the owner public key is set as the token owner identity, and when performing actions against tokens, ownership proof is established by providing a signature generated by the owner private key and validated against the public key or hash of the public key listed as the owner of the token. A person can be uniquely identified, for example, using a combination of a user name, social security number, and biometric (e.g., fingerprint). The creation of an identity token for an asset in a blockchain establishes provenance of the asset, and the identity token can be used in transactions (e.g., buying, selling, insuring) involving the asset stored in a blockchain, creating a full audit trail of the transactions.

To enable more complex transactions than bitcoin can support, some systems use "smart contracts." A smart contract is computer code that implements transactions of a contract. The computer code may be executed in a secure platform (e.g., an Ethereum platform, which provides a virtual machine) that supports recording transactions in blockchains. In addition, the smart contract itself is recorded as a transaction in the blockchain using an identity token that is a hash (i.e., identity token) of the computer code so that the computer code that is executed can be authenticated. When deployed, a constructor of the smart contract executes, initializing the smart contract and its state. The state of a smart contract is stored persistently in the blockchain. When a transaction is recorded against a smart contract, a message is sent to the smart contract, and the computer code of the smart contract executes to implement the transaction (e.g., debit a certain amount from the balance of an account or a cryptocurrency digital wallet). The computer code ensures that all the terms of the contract are complied with before the transaction is recorded in the blockchain.

When a message is sent to a smart contract to record a transaction, the message is sent to each node that maintains a replica of the blockchain. Each node executes the computer code of the smart contract to implement the transaction. For example, if 100 nodes each maintain a replica of a blockchain, then the computer code executes at each of the 100 nodes. When a node completes execution of the computer code, the result of the transaction is recorded in the blockchain. The nodes employ a consensus algorithm to decide which transactions to keep and which transactions to discard. Although the execution of the computer code at each node helps ensure the authenticity of the blockchain, it requires large amounts of computer resources to support such redundant execution of computer code.

Although blockchains can effectively store transactions, the large amount of computer resources, such as storage and computational power, needed to mine new blocks and maintain all the replicas of the blockchain can be problematic. To overcome this problem, some systems for storing transactions do not use blockchains, but rather have each party to a transaction maintain its own copy of the transaction. One such system is the Corda system developed by R3, Ltd., which provides a decentralized distributed ledger platform in which each participant in the platform has a node (e.g., computer system) that maintains its portion of the distributed ledger. When parties agree on the terms of a transaction, a party submits the transaction to a notary, which is a trusted node, for notarization. The notary maintains an UTXO database of unspent transaction outputs. When a transaction is received, the notary checks the inputs to the transaction against the UTXO database to ensure that the outputs that the inputs reference have not been spent. If the inputs have not been spent, the notary updates the UTXO database to indicate that the referenced outputs have been spent, notarizes the transaction (e.g., by signing the transaction or a transaction identifier with a public key of the notary), and sends the notarization to the party that submitted the transaction for notarization. When the party receives the notarization, the party stores the notarization and provides the notarization to the counterparties.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method performed by one or more computing systems for generating authentication information for an image using optical computing, the method comprising:
   receiving light from an object;
   receiving a random key from an authentication server;
   converting the received light to plenoptic data;
   uploading the plenoptic data to the authentication server;
   generating an optical hash of the received light using the random key;
   converting the generated optical hash to a digital optical hash; and
   uploading the digital optical hash to the authentication server.

2. The method of claim 1 further comprising splitting the received light into two paths using a beam splitter.

3. The method of claim 1 further comprising redirecting the received light down a first path at one time and a second path at a subsequent time.

4. The method of claim 1 wherein the plenoptic data includes information about a full vector field of the light, including intensity and direction of the light, captured by a plenoptic camera.

5. The method of claim 1 wherein the generation of the optical hash comprises:
   splitting the light into a plurality of light rays, each light ray having unique angle and location; and
   applying optical processing to the plurality of light rays.

6. The method of claim 5 wherein the light is split using a holographic plate whose angle is determined by the random key.

7. The method of claim 5 wherein the optical processing includes modulating intensity of each light ray as the light ray traverses a series of filters wherein:
   each filter includes a plurality of attenuating pixels;
   each pixel has a tunable attenuation coefficient; and
   the intensity of each light ray is attenuated in accordance with the attenuation coefficient of each pixel that the light ray passes through.

8. The method of claim 7 wherein the attenuation coefficient of each pixel is determined by the random key.

9. The method of claim 7 wherein each pixel is wired with a circuit and the attenuation coefficient of each pixel is controlled by an electronic signal to the circuit based on the random key.

10. The method of claim 7 wherein the filters are liquid crystal thin films.

11. The method of claim 1 wherein the conversion of the optical hash to the digital optical hash is done by a CMOS detector.

12. The method of claim 11 further comprising before converting the optical hash to the digital optical hash, condensing the optical hash to fit a resolution of the CMOS detector.

13. The method of claim 1 wherein the conversion of the optical hash to the digital optical hash comprises:
   dividing the optical hash into a plurality of sub-hashes;
   converting each sub-hash to a digital optical hash; and
   stitching together the digital optical hashes into a single digital optical hash.

14. One or more computing systems for generating authentication information for an image using optical computing, the one or more computing systems comprising:
   one or more non-transitory computer-readable storage mediums storing computer-executable instructions; and
   one or more processors for executing the computer-executable instructions stored in the one or more computer-readable storage mediums, the computer-executable instructions for controlling the one or more computing systems to:
   receive light from an object;
   access a random key;
   convert the received light to plenoptic data;
   upload the plenoptic data;
   generate an optical hash of the received light using the random key;
   convert the optical hash to a digital optical hash; and
   upload a representation of the digital optical hash.

15. The one or more computing systems of claim 14 wherein the representation of the digital optical hash is the digital optical hash.

16. The one or more computing systems of claim 14 wherein the representation of the digital optical hash is a hash of the digital optical hash.

17. The one or more computing systems of claim 14 wherein the plenoptic data and the representation of the digital optical hash are uploaded to an authentication server.

18. The one or more computing systems of claim 14 wherein the plenoptic data and the representation of the digital optical hash are uploaded to a distributed ledger.

19. The one or more computing systems of claim 14 wherein the random key is downloaded from an authentication server.

20. The one or more computing systems of claim 14 wherein the random key is provided by an oracle and stored in a distributed ledger.

21. The one or more computing systems of claim 20 wherein the oracle is an authentication server.

22. The one or more computing systems of claim 14 wherein the random key is generated using a security token embedded in an image capturing device.

23. The one or more computing systems of claim 14 wherein the computer-executable instructions further control the one or more computing systems to group a number of digital optical hashes as a single package and upload a hash of the package.

24. The one or more computing systems of claim 23 wherein the number of digital optical hashes to be grouped is set by a user.

25. The one or more computing systems of claim 23 wherein the number of digital optical hashes to be grouped is downloaded from an authentication server.

26. The one or more computing systems of claim 23 wherein the computer-executable instructions further control the one or more computing systems to determine the number of digital optical hashes to be grouped automatically based on upload speeds.

27. A method performed by one or more computing systems for authenticating an image, the method comprising:
   transmitting a random key to an image capturing device;
   receiving plenoptic data from the image capturing device;
   receiving a digital optical hash from the image capturing device;
   calculating a time difference between the transmission of the random key and the receipt of the digital optical hash;
   determining whether the plenoptic data and the digital optical hash are generated from same light; and
   when the time difference is less than a threshold time and when the plenoptic data and the digital optical hash are generated from the same light, generating a seal of authentication for the image.

28. The method of claim 27 wherein the determination of whether the plenoptic data and the digital optical hash are generated from the same light includes spot checking the digital optical hash, the spot checking comprising:
   randomly selecting a plurality of pixels from the digital optical hash;
   identifying light rays that could reach the selected pixels;
   simulating paths and attenuations of the identified light rays through an optical scrambler; and
   comparing a result of the simulation to the digital optical hash.

29. The method of claim 27 wherein the threshold time is set such that producing a forgery via computer simulation is impossible even with a supercomputer.

30. The method of claim 27 wherein the seal of authenticity includes a watermark, a digital signature, or a hash of the image.

31. The method of claim 27 wherein a database of hash values corresponding to authenticated images is published to allow easy identification of the authenticated images.

32. One or more computing systems for authenticating an image, the one or more computing systems comprising:
   one or more non-transitory computer-readable storage mediums storing computer-executable instructions; and
   one or more processors for executing the computer-executable instructions stored in the one or more computer-readable storage mediums, the computer-executable instructions for controlling the one or more computing systems to:
   access a random key;
   access plenoptic data associated with the random key;
   access a digital optical hash associated with the random key; and
   verify whether the plenoptic data and the digital optical hash are generated from same light based on the plenoptic data and the digital optical hash being associated with the same random key and based on the digital optical hash being generated using the random key.

33. The one or more computing systems of claim 32 wherein the computer-executable instructions further control the one or more computing systems to:
   access a timestamp of the random key;
   access a timestamp of the digital optical hash;
   calculate a time difference between the timestamp of the random key and the timestamp of the digital optical hash; and
   verify whether the time difference is less than a threshold time.

34. The one or more computing systems of claim 33 wherein the timestamps are non-interactive timestamps.

35. The one or more computing systems of claim 34 wherein the timestamps are quantum non-interactive time stamps.

36. The one or more computing systems of claim 32 wherein the random key, the plenoptic data, and the digital optical hash are recorded in a distributed ledger.

37. The one or more computing systems of claim 34 wherein the verification of whether the plenoptic data and the digital optical hash are generated from the same light is performed by a smart contract.

* * * * *